(12) United States Patent
Neville et al.

(10) Patent No.: US 11,118,467 B2
(45) Date of Patent: Sep. 14, 2021

(54) SYSTEM AND METHOD FOR CONVERTING TURBINE COOLING NOZZLE

(71) Applicant: General Electric Company, Schenectady, NY (US)

(72) Inventors: Jason A. Neville, Greenville, SC (US); Mitchell Merrill, Greenville, SC (US); Stephen Newman, Greenville, SC (US); Jaime Maldonado, Greenville, SC (US)

(73) Assignee: General Electric Company, Schenectady, NY (US)

( * ) Notice: Subject to any disclaimer, the term of this patent is extended or adjusted under 35 U.S.C. 154(b) by 748 days.

(21) Appl. No.: 15/660,187

(22) Filed: Jul. 26, 2017

(65) Prior Publication Data

US 2019/0032500 A1   Jan. 31, 2019

(51) Int. Cl.
| | |
|---|---|
| *F01D 9/06* | (2006.01) |
| *F01D 9/04* | (2006.01) |
| *F02C 3/04* | (2006.01) |
| *F01D 5/18* | (2006.01) |

(52) U.S. Cl.
CPC ............ *F01D 9/065* (2013.01); *F01D 9/041* (2013.01); *F02C 3/04* (2013.01); *F01D 5/189* (2013.01); *F05D 2230/10* (2013.01); *F05D 2230/80* (2013.01); *F05D 2260/201* (2013.01); *F05D 2260/22141* (2013.01)

(58) Field of Classification Search
CPC .......... F01D 9/065; F01D 5/189; F01D 25/12; F01D 25/188; F01D 5/188; F05D 2260/22141; F05D 2260/206; F05D 2230/10; F05D 2230/80; F05D 2260/201; F02C 3/04
See application file for complete search history.

(56) References Cited

U.S. PATENT DOCUMENTS

| | | | | |
|---|---|---|---|---|
| 4,040,767 | A * | 8/1977 | Dierberger | F01D 5/182 |
| | | | | 415/115 |
| 7,007,488 | B2 * | 3/2006 | Orlando | F01D 9/065 |
| | | | | 60/782 |
| 8,016,547 | B2 * | 9/2011 | Propheter-Hinckley | |
| | | | | F01D 5/188 |
| | | | | 415/115 |
| 8,777,569 | B1 * | 7/2014 | Liang | F01D 5/188 |
| | | | | 416/96 A |
| 9,885,254 | B2 * | 2/2018 | Lienau | F01D 25/162 |

(Continued)

*Primary Examiner* — Courtney D Heinle
*Assistant Examiner* — Danielle M. Christensen
(74) *Attorney, Agent, or Firm* — Nixon & Vanderhye P.C.

(57) ABSTRACT

A stationary component of a turbine section of a turbine engine system includes a hollow vane assembly with an interior rib separating a first interior compartment from a second interior compartment. The first and second interior compartments are configured to receive the cooling fluid. The cooling fluid is allowed to communicate between the first and second interior compartments. The stationary component also includes a diaphragm attached to the hollow vane assembly. The diaphragm is configured to receive the cooling fluid from the hollow vane assembly. The diaphragm includes a chamber and a tube extending through the chamber. The tube is configured to isolate the chamber from the cooling fluid while delivering the cooling fluid from the hollow vane assembly to the wheelspace area.

19 Claims, 9 Drawing Sheets

(56) References Cited

U.S. PATENT DOCUMENTS

| | | | |
|---|---|---|---|
| 10,156,147 B2* | 12/2018 | Waite | F01D 5/189 |
| 10,260,363 B2* | 4/2019 | Snider | F01D 11/003 |
| 2005/0042075 A1* | 2/2005 | Yang | F01D 21/003 |
| | | | 415/115 |
| 2005/0089393 A1* | 4/2005 | Zatorski | F01D 5/081 |
| | | | 415/115 |
| 2011/0189000 A1* | 8/2011 | Vedhagiri | F01D 25/08 |
| | | | 415/178 |
| 2014/0286762 A1* | 9/2014 | Kerber | F01D 5/189 |
| | | | 415/175 |
| 2017/0058686 A1* | 3/2017 | Bancheri | F01D 9/041 |

* cited by examiner

SYSTEM AND METHOD FOR CONVERTING TURBINE COOLING NOZZLE

FIELD OF THE INVENTION

The subject matter disclosed herein relates to a cooling system on a turbomachine; and more particularly to, a system for regulating a cooling fluid within a wheelspace area of a turbomachine.

BACKGROUND OF THE INVENTION

Turbomachines such as gas turbine engines at typically operated at high temperatures that are most efficient for generating and extracting energy from the combustion gases. Certain components of the gas turbine engine, for example, stationary vane segments of a turbine stator assembly which closely surround the turbine rotor and which define the outer boundary for the hot combustion gases flowing through the turbine, are directly exposed to the heated stream of combustion gases. The vane segments typically incorporate one, two or more individual vanes or airfoils extending between inner and outer bands or shrouds.

In some gas turbines, a portion of the air compressed by the compressor is diverted from combustion system to cool the stationary and rotating components or to purge cavities within the gas turbine. In one configuration, the diverted airflow (hereinafter "cooling fluid") is routed through the stationary vane segments. The entire nozzle diaphragm is pressurized so as to force enough cooling air into the wheelspace to purge any resident hot gases. However, the diverted cooling fluid consumes a considerable amount of the total airflow that has been compressed by the compressor or by other means. The work performed on this diverted cooling fluid is non-recoverable. Therefore, consuming as little as possible is desirable for gas turbine efficiency.

BRIEF SUMMARY OF INVENTION

Aspects of the system and method for supplying fluid to a gas turbine component and other large industrial machines described herein provide solutions to one or more problems or disadvantages associated with the prior art.

In one exemplary but non-limiting aspect, the present disclosure relates to a stationary component of a turbine section of a gas turbine engine system that may include a hollow vane assembly with an interior rib separating a first interior compartment from a second interior compartment. The first and second interior compartments may be configured to receive the cooling fluid. The rib may allow, or not allow, the cooling fluid to communicate between the first and second interior compartments. The stationary component may also include a diaphragm attached to the hollow vane assembly. The diaphragm may be configured to receive the cooling fluid from the hollow vane assembly. The diaphragm may include a chamber and a tube extending through the chamber. The tube may be configured to isolate the chamber from the cooling fluid while delivering the cooling fluid from the hollow vane assembly to the wheelspace area.

In another exemplary but non-limiting aspect, the present disclosure relates to a method for converting a stationary component of a turbine section of a gas turbine engine system. The stationary component may include a hollow vane assembly with an interior rib separating a first interior compartment from a second interior compartment. The stationary component may also include a diaphragm with a chamber adapted to receive cooling fluid from the hollow vane assembly and deliver the cooling fluid to the wheelspace area. The method may include modifying the rib to permit the cooling fluid to flow between the first and second interior compartments. The method may further include sealing the diaphragm from the wheelspace to prevent fluid communication between the chamber and the wheelspace.

In yet another exemplary but non-limiting aspect, the present disclosure relates to a method for converting a stationary component of a gas turbine engine system. The stationary component may include a hollow vane assembly with an interior rib separating a first interior compartment from a second interior compartment. The stationary component may further include a diaphragm with a chamber adapted to receive cooling fluid from the hollow vane assembly and deliver the cooling fluid to the wheelspace area. The method may include modifying or eliminating the rib to permit the cooling fluid to flow between the first and second interior compartments. The method may further include replacing the diaphragm with a modified diaphragm in which the chamber is fluidly isolated from the wheelspace area.

Utilizing a diaphragm with a pressurized chamber requires a substantial amount of fluid to maintain the pressures necessary to prevent backflow from the wheelspace areas. In addition, the amount of cooling fluid diverted from the main flow that is combusted contributes to inefficiencies in the gas turbine system. Since a design directly fed with a tube has known interfaces and less variation than pressurizing the entire diaphragm cavity, using an airflow tube to convey the cooling fluid instead of the diaphragm chamber would allow for a reduced amount of cooling fluid without sacrificing fluid pressure. Accordingly, using an unpressurized diaphragm chamber (instead of a pressurized diaphragm chamber) with an airflow tube positioned therein can increase the efficiency of the gas turbine system by reducing the amount of cooling fluid diverted from the main flow of compressed gas.

In addition, for a turbine section utilizing stationary components with pressurized diaphragms, it may be more cost effective to convert the existing stationary component to utilize an unpressurized diaphragm rather than replace the existing stationary component with a new stationary component having an unpressurized diaphragm. It may even be impossible to replace the stationary component without replacing an entire portion of the turbine section of the gas turbine system.

DETAILED DESCRIPTION OF THE INVENTION

It should be understood that the various numbers in the figures represent like components throughout the several views.

Figure 1:
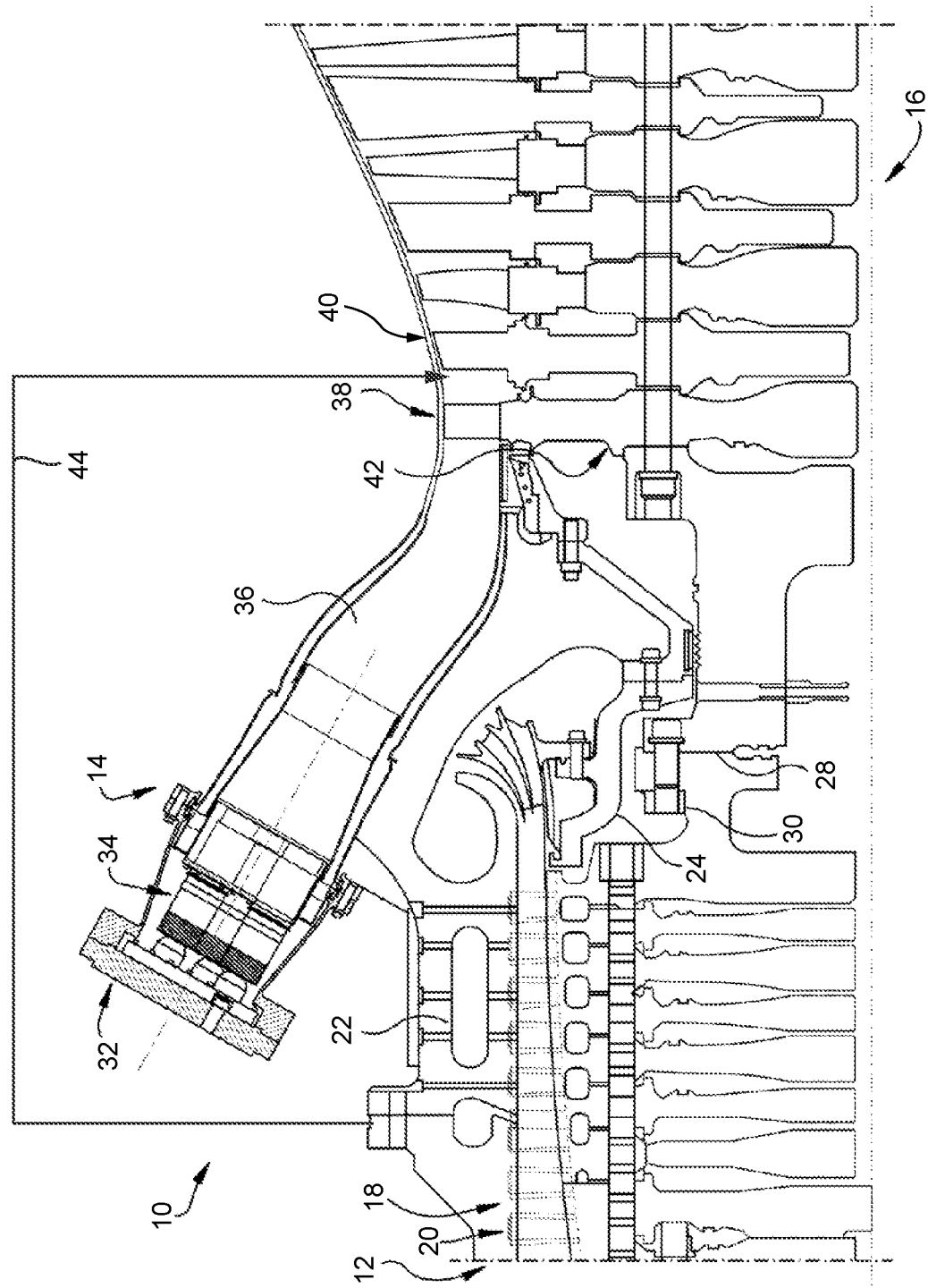
FIG. 1 is a schematic view, in cross-section, of a gas turbine, illustrating the environment in which an embodiment of the present invention operates.

FIG. 1 is a schematic view, in cross-section, of a portion of an exemplary gas turbine 10. The gas turbine 10 may include a compressor section 12, a combustion section 14 and a turbine section 16.

The compressor section 12 may include a plurality of rotating blades 18 and stationary vanes 20 structured to compress a fluid. The compressor section 12 may also include an extraction port 22, an inner barrel casing 24, a compressor discharge casing 26, a marriage joint 28 and a marriage joint bolt 30.

The combustion section 14 may include a plurality of combustion cans 32, a plurality of fuel nozzles 34 and a plurality of transition sections 36. The plurality of combustion cans 32 may be coupled to a fuel source. Within each combustion can 32, compressed air may be received from the compressor section 12 and mixed with fuel received from the fuel source. The air and fuel mixture may be combusted to create a working fluid. The working fluid may proceed from the aft end of the plurality of fuel nozzles 34 downstream through the transition section 36 into the turbine section 16.

The turbine section 16 may include a plurality of rotating components 38, a plurality of stationary components 40, and a plurality of wheelspace areas 42 between the rotating components 38 and the stationary components 40. The turbine section 16 may convert the working fluid to a mechanical torque.

Typically, during the operation of the gas turbine 10, a plurality of components may experience high temperatures and may require cooling or purging. These components may include a portion of the compressor section 12, the marriage joint 28, the plurality of rotating components 38 and the plurality of stationary components 40.

The extraction port 22 may draw cooling fluid from the compressor section 12. The cooling fluid may bypass the combustion section 14 and flow through a cooling path 44 for cooling or purging various portions of the gas turbine 10. The cooling path 44 may ultimately direct the cooling fluid to the wheelspace areas 42 in order to protect the inner sides of the stationary components 40 from the extreme temperature of the working fluid.

Figure 2:
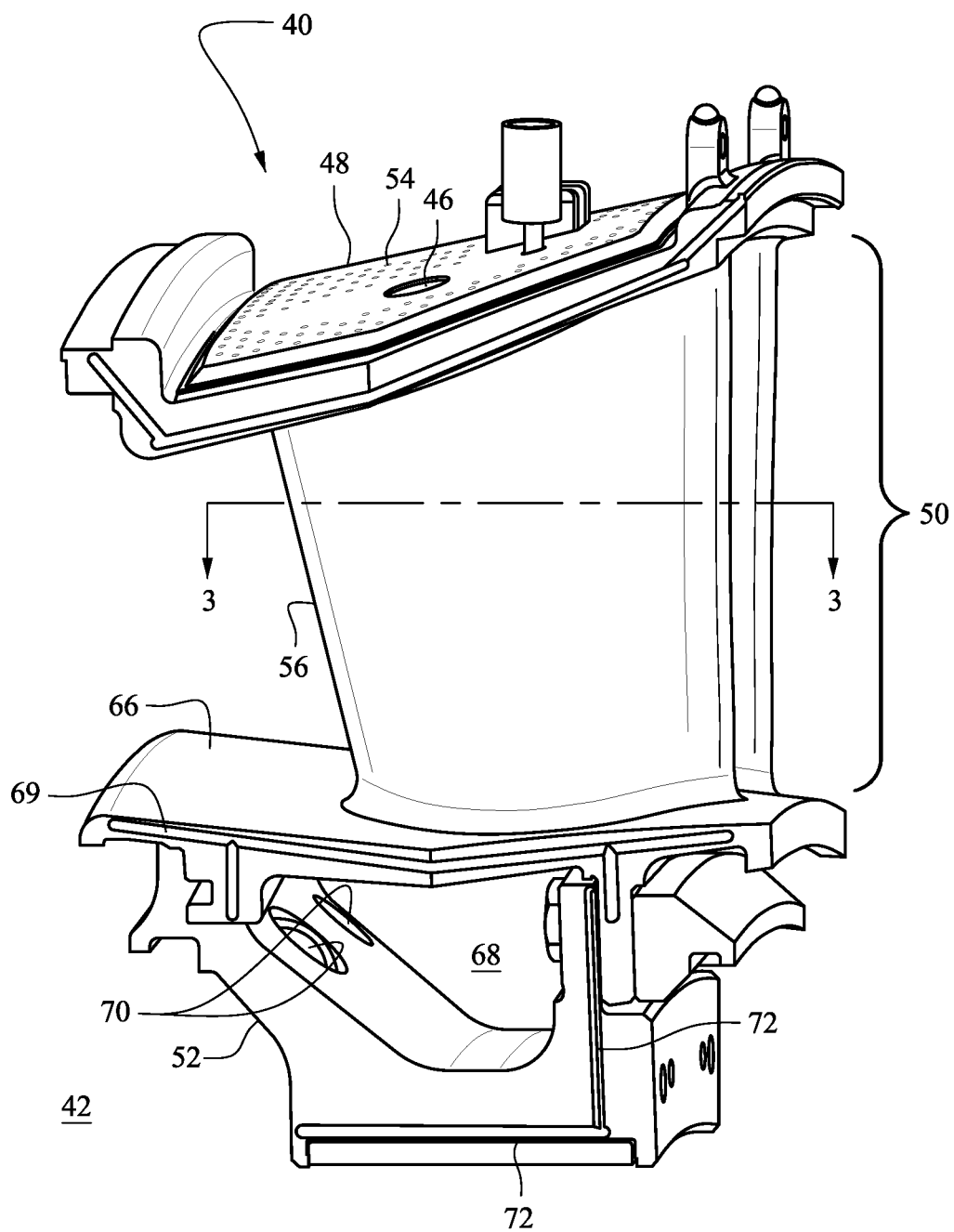
FIG. 2 is an exemplary turbine isometric view.
Figure 3:
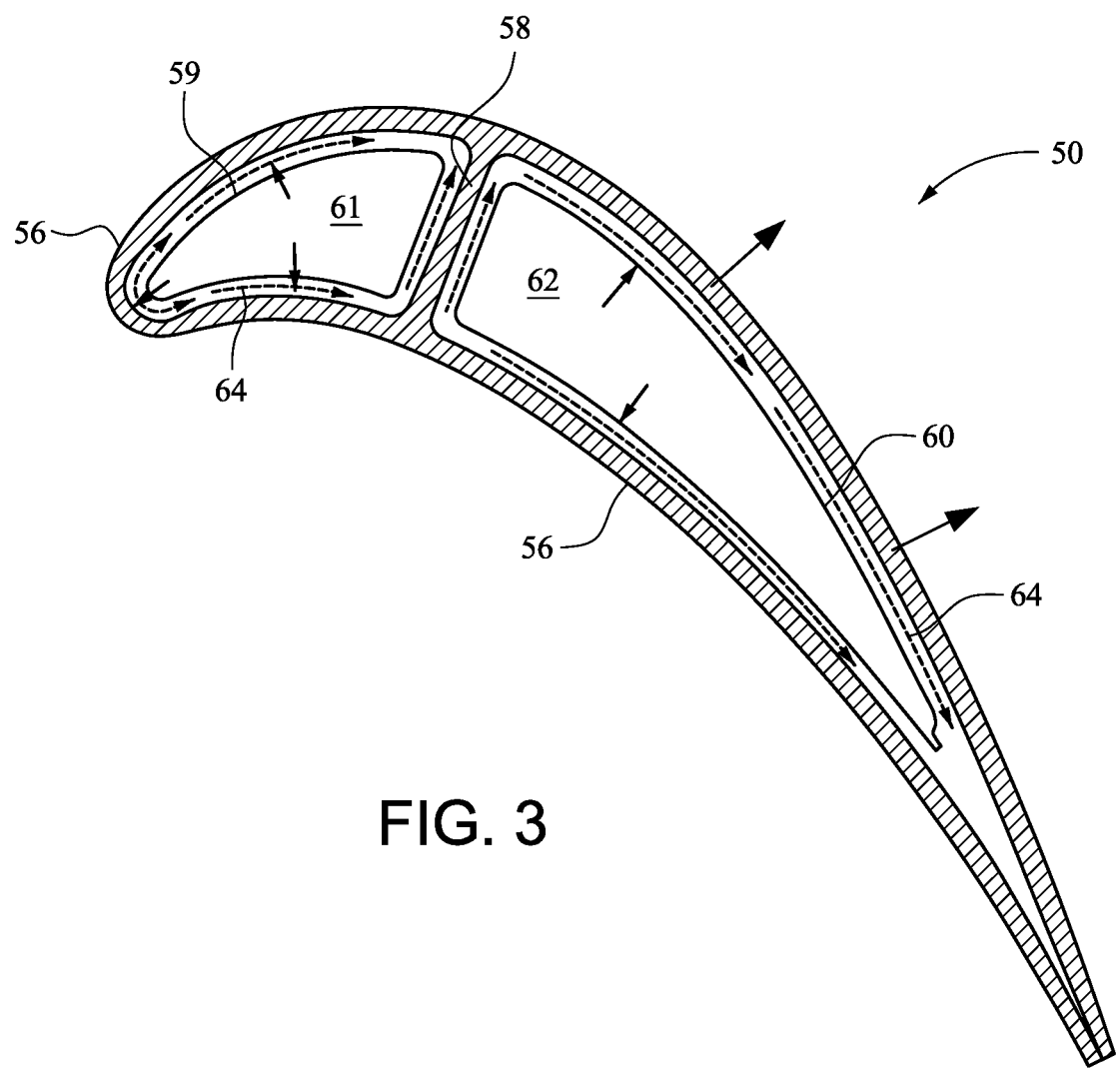
FIG. 3 is a cross-sectional view of the exemplary turbine section vane of FIG. 2.

FIGS. 2 and 3 illustrate an exemplary stationary component 40 that may receive the cooling fluid through an opening 46 in an impingement plate 48. The impingement plate 48 may be located on a casing side of the stationary component 40 that is adjacent a casing of the turbine section 16. The opening 46 may be fluidly a cavity (not shown) adjacent the impingement plate 48 into which the cooling fluid may be dumped from the cooling path 44. At least a portion of the cooling fluid may exit the stationary component 40 at the end of the stationary component 40 adjacent the wheelspace areas 42. In addition to the impingement plate 48, the stationary component 40 may include a vane (or nozzle) assembly 50 and a diaphragm 52. At least a portion of the cooling fluid may exit through an aft side of the vane (or nozzle) assembly 50.

The impingement plate 48 and an upper portion of the vane assembly 50 may define a receiving chamber that receives the cooling fluid from the opening 46. Most of the cooling fluid in the receiving chamber may flow into the vane assembly 50. However, some of the cooling fluid may be expelled through impingement holes 54 in the impingement plate 48. The cooling fluid expelled through the impingement holes 54 may form a barrier protecting the casing and the stationary component 40 from the excessive heat of the working fluid. The number of impingement holes 54 may be a function of the volume of cooling fluid flowing into the stationary component 40.

The vane assembly 50 may receive the cooling fluid from the receiving chamber and may include an outer shell 56, one or more ribs 58 (FIG. 3), a forward impingement sleeve 59 and an aft impingement sleeve 60. The outer shell 56 may have an air foil shape and may be positioned to direct the working fluid against the rotating component 38. The one or more ribs 58 may provide support to the outer shell 56 and may divide the stationary component 40 into multiple compartments (e.g., forward compartment 61 and an aft compartment 62) that extend from the receiving chamber to the diaphragm 52. The forward compartment 61 may contain the forward impingement sleeve 59 with a plurality of impingement openings (not shown). The aft compartment 62 may contain the aft impingement sleeve 60. The number of impingement openings may be a function of the volume of cooling fluid flowing through the vane assembly 50.

At least a portion of the cooling fluid flowing through the forward compartment 61 may flow through the impingement openings in the forward impingement sleeve 59 and into flow paths 64 adjacent inner surfaces of the outer shell 56. In addition, at least a portion of the cooling fluid flowing through the aft compartment 62 may flow through the impingement openings in the aft impingement sleeve 60 and into the flow paths 64. The flow paths 64 may extend along the length of the vane assembly 50. The cooling fluid in the flow paths 64 may prevent the outer shell 56 from reaching an excessive temperature due to interactions with the working fluid. Cooling fluid from the forward compartment 61 may flow into the diaphragm 52, while cooling fluid from the aft compartment 62 may flow through an aft side of the outer shell 56 of the vane (or nozzle) assembly 50.

The vane assembly 50 may include a plate 66 with an opening (not shown) through which the cooling fluid from the forward compartment 62 may communicate with the diaphragm 52. The opening may be sized to the full extent of a chamber 68 in the diaphragm 52. Alternatively, the size and the shape of the opening in the plate 66 may be smaller than the chamber 68. In addition, the plate 66 may include a seal 69 to prevent leakage of cooling fluid between the vane assembly 50 and the diaphragm 52.

The diaphragm 52 may receive the cooling fluid from the vane assembly 50 and may direct the cooling fluid to the wheelspace area 42 by way of one or more openings 70. The chamber 68 may be sealed off from the wheelspace area 42 (except for the locations at the openings 70) by way of seals 72.

The cooling fluid in the wheelspace area 42 may be pressurized to prevent the working fluid (which is at an elevated temperature) from encroaching into the wheelspace area 42 and possibly damaging the components exposed in the wheelspace area 42. In order to maintain the desired pressure of the cooling fluid in the wheelspace area 42, the diaphragm 52 may be pressurized to prevent backflow from the wheelspace area 42 through the openings 70. In order to maintain the diaphragm 52 at the desired pressure, a predetermined volume of cooling fluid at a predetermined flow rate may be delivered to the diaphragm 52.

Figure 4:
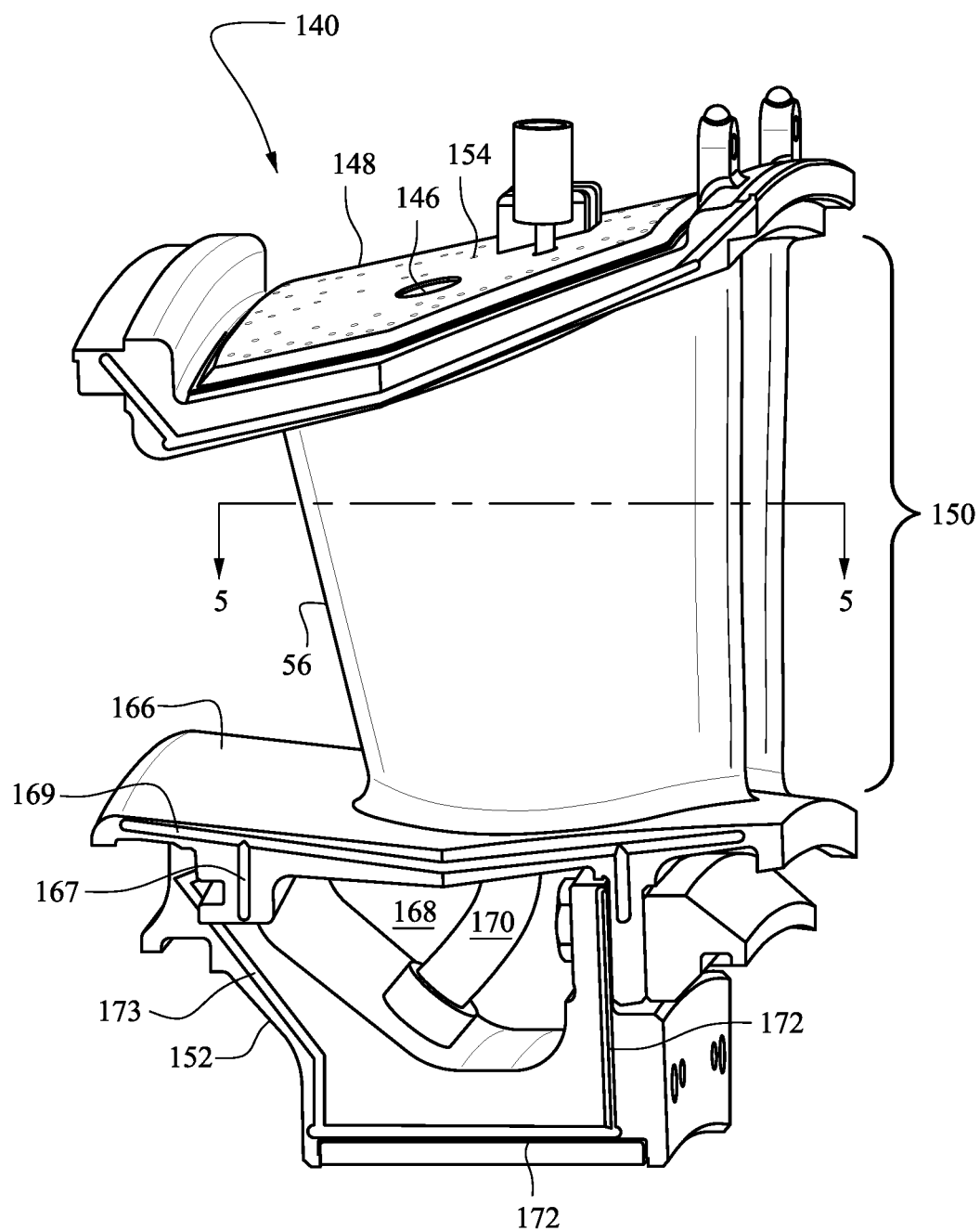
FIG. 4 is another exemplary turbine isometric view.
Figure 5:
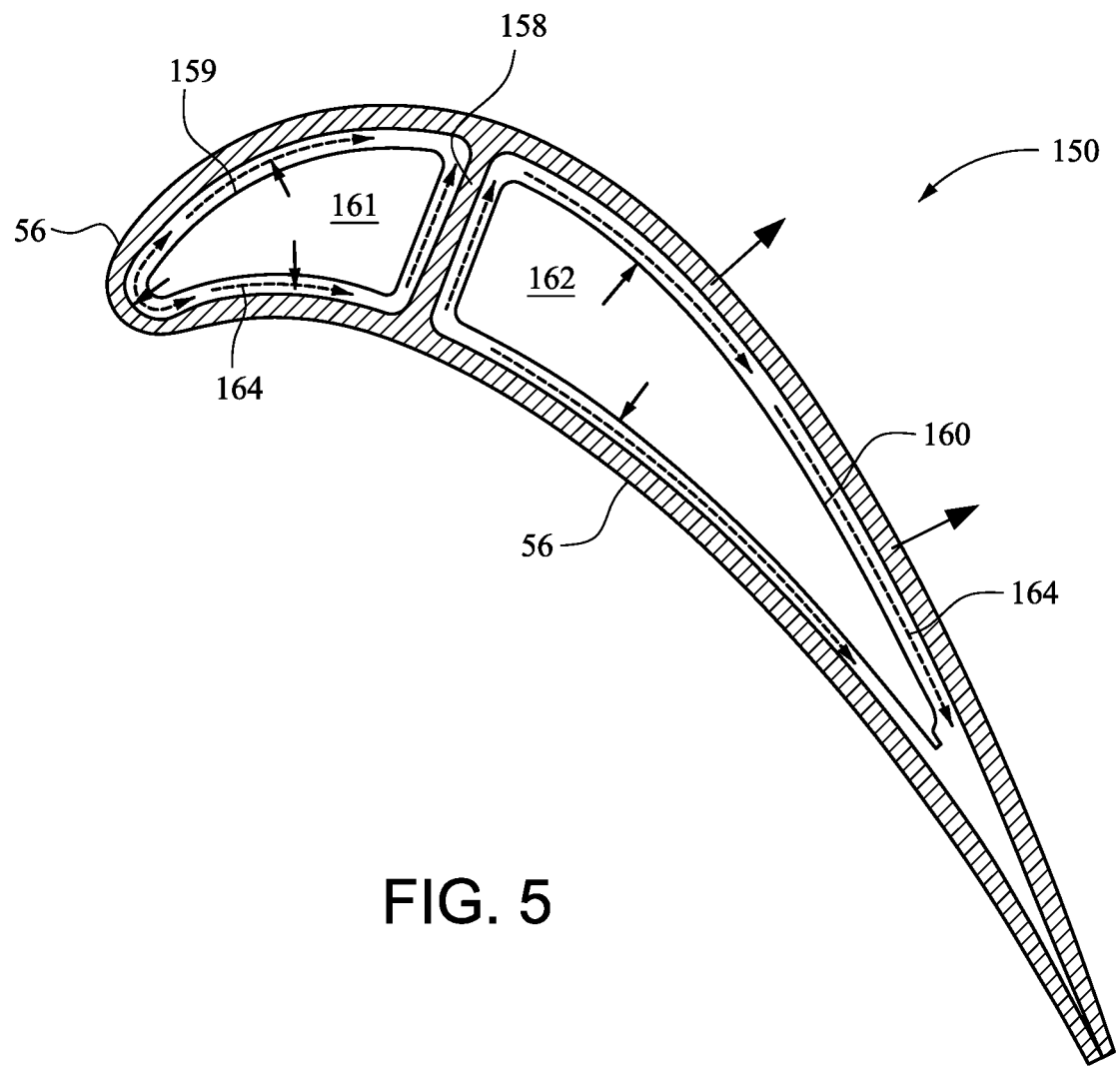
FIG. 5 is a cross-sectional view of the turbine section vane of FIG. 4.

It is contemplated that the volume of cooling fluid needed to maintain the pressure in the wheelspace area 42 for a given flow rate may be reduced by modifying the stationary component 40. FIG. 4 shows a modified stationary component 140 that uses less cooling fluid to maintain the pressure in the wheelspace area 42.

Similar to the stationary component 40, the modified stationary component 140 may receive the cooling fluid through an opening 146 in an impingement plate 148. The impingement plate 148 may be located on a casing side of the stationary component 140 that is adjacent a casing of the turbine section 16. The opening 146 may be fluidly connected to a conduit (not shown) of the cooling path 44. At least a portion of the cooling fluid may exit the stationary component 140 at the end of the stationary component 140 adjacent the wheelspace areas 42. In addition to the impingement plate 148, the stationary component 140 may include a vane (or nozzle) assembly 150 and a diaphragm 152. At least a portion of the cooling fluid may exit through an aft side of the vane (or nozzle) assembly 150.

The impingement plate 148 and an upper portion of the vane assembly 150 may define a receiving chamber that receives the cooling fluid from the opening 146. Most of the cooling fluid in the receiving chamber may flow into the vane assembly 150. However, some of the cooling fluid may be expelled through impingement holes 154 in the impingement plate 148. The cooling fluid expelled through the impingement holes 154 may form a barrier protecting the casing and the stationary component 140 from the excessive heat of the working fluid. The number of impingement holes 154 may be a function of the volume of cooling fluid flowing into the stationary component 140.

Figure 6:
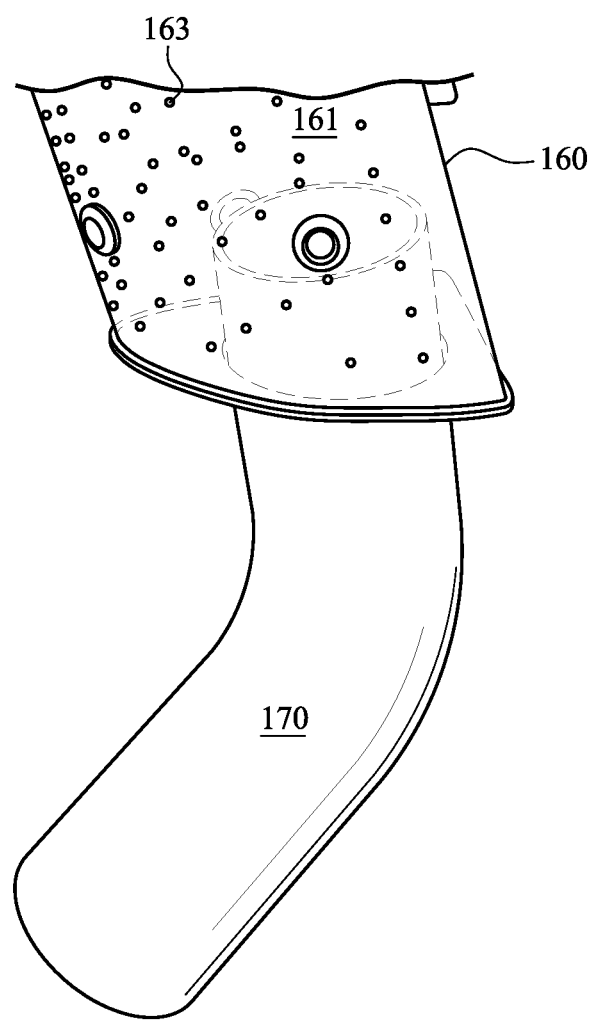
FIG. 6 is an exemplary air tube assembly for the turbine section vane of FIG. 4.

The vane assembly 150 may receive the cooling fluid from the receiving chamber and may include an outer shell 56, one or more ribs 158 (FIG. 3), a forward impingement sleeve 159 and an aft impingement sleeve 160. The outer shell 56 may have an air foil shape and may be positioned to direct the working fluid against the rotating component 38. The one or more ribs 158 may provide support to the outer shell 56 and may divide the stationary component 140 into multiple compartments (e.g., a forward compartment 161 and an aft compartment 162) that extend from the receiving chamber to the diaphragm 152. The forward compartment 161 may contain the forward impingement sleeve 159 with a plurality of impingement openings 163 (FIG. 6). The aft compartment 162 may contain the aft impingement sleeve 160.

At least a portion of the cooling fluid flowing through the forward compartment 161 may flow through the impingement openings 163 in the forward impingement sleeve 159 (FIG. 6) and into flow paths 164 adjacent inner surfaces of the outer shell 56. In addition, at least a portion of the cooling fluid flowing through the aft compartment 162 may flow through the impingement openings (not shown) in the aft impingement sleeve 160 and into the flow paths 164. The flow paths 164 may extend along the length of the vane assembly 150. The cooling fluid in the flow paths 164 may prevent the outer shell 56 from reaching an excessive temperature due to interactions with the working fluid. Cooling fluid from the forward compartment 161 may flow toward the diaphragm 152, while cooling fluid from the aft compartment 162 may flow through an aft side of the outer shell 56 of the vane (or nozzle) assembly 150.

As can be seen in FIG. 4, the vane assembly 150 may include a plate 166 that attaches the vane assembly 150 to the diaphragm 152. The plate 166 may include a seal 169 to prevent leakage of cooling fluid between the vane assembly 150 and the diaphragm 152. Unlike the seal 69, the seal 169 may include a forward portion 167 that extends downward at a front side of a chamber 168 (of the diaphragm 152) to seal a portion of the front side of the chamber 168.

The diaphragm 152 may receive the cooling fluid from the vane assembly 150 by way of an air tube 170 that penetrates the plate 166 through an opening (not shown) in the plate 166 and penetrates a forward side of the diaphragm 152 to directly communicate with the wheelspace area 42 so that the chamber 168 is isolated from the flow of the cooling fluid. Thus, unlike the chamber 68, the chamber 168 may remain unpressurized. The chamber 168 may be further sealed off from the wheelspace area 42 by way of seals 172. The seals 172 may be different from the seals 72 in that the seals 172 may include a forward portion 173 that may seal a forward section of the chamber 168 and may cover the openings 70 if the openings 70 exist. It is contemplated that the air tube 170 may extend through one of the openings 70. In such a configuration, the opening 70 through which the air tube 170 extends would not be sealed by the forward portion 173.

Isolating the chamber 168 of the diaphragm 152 from the flow of cooling fluid being directed to the wheelspace area 42 may reduce the amount of cooling fluid needed to pressurize the wheelspace area 42. However, the reduced amount of cooling fluid may reduce the pressure of cooling fluid in the aft compartment 162, which may adversely affect the flow of cooling fluid through the aft surface of the vane (or nozzle) assembly 150.

It is contemplated that the number of impingement openings in the aft impingement sleeve 160 may be fewer than the number of impingement openings in the aft impingement sleeve 60 in order to achieve an optimal or desired pressure in the aft compartment 162 when the amount of cooling fluid is reduced. It is further contemplated to simply convert the forward and aft impingement sleeves 59, 60 rather than using new forward and aft impingement sleeves 159, 160. The forward and/or aft impingement sleeves 59, 60 may then be converted to reduce the number of impingement openings by covering or filling some of the impingement openings. The number of impingement openings may be a function of the volume of cooling fluid flowing through the vane assembly 150. It should be understood that the number of impingement openings in the aft impingement sleeve 160 may be greater than or less than the number of impingement openings in the forward impingement sleeve 159 (i.e., the forward and aft impingement sleeves may have different numbers of impingement openings). The ratio of impingement openings in the aft impingement sleeve 160 to the number of impingement openings in the forward impingement sleeve 159 may be selected to maintain sufficient impingement pressures in both the forward and aft compartments 161, 162.

It is further contemplated that the forward and/or aft impingement sleeves 59, 60 may be used in the modified stationary component 140 without the forward and/or aft impingement sleeves 59, 60 being modified. However, the loss of pressure in the aft compartment 162 due to less cooling fluid may still need to be addressed. One way to address the loss of pressure in the aft compartment 162 is to increase fluid communication between the forward compartment 161 and the aft compartment 162.

Figure 7:
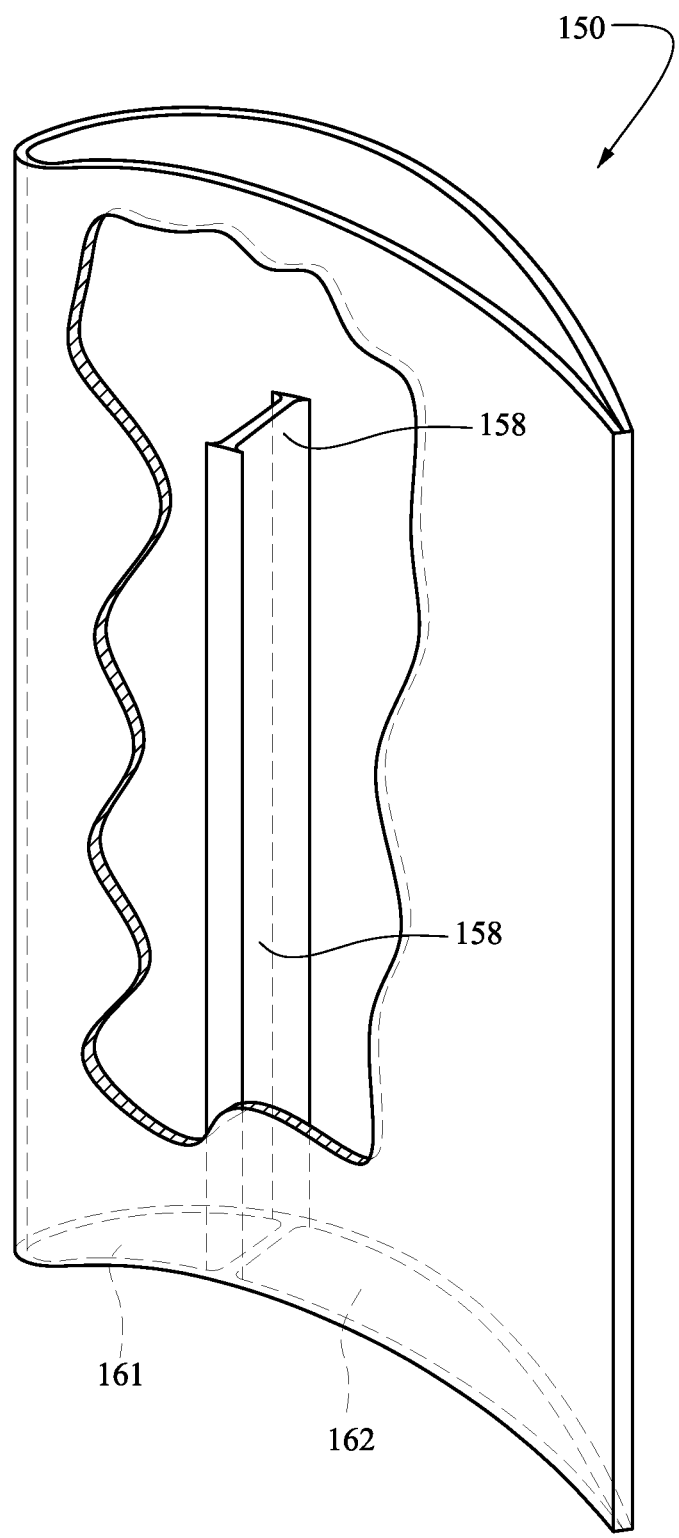
FIG. 7 is a perspective view of one exemplary interior of the turbine section vane of FIG. 4.
Figure 8:
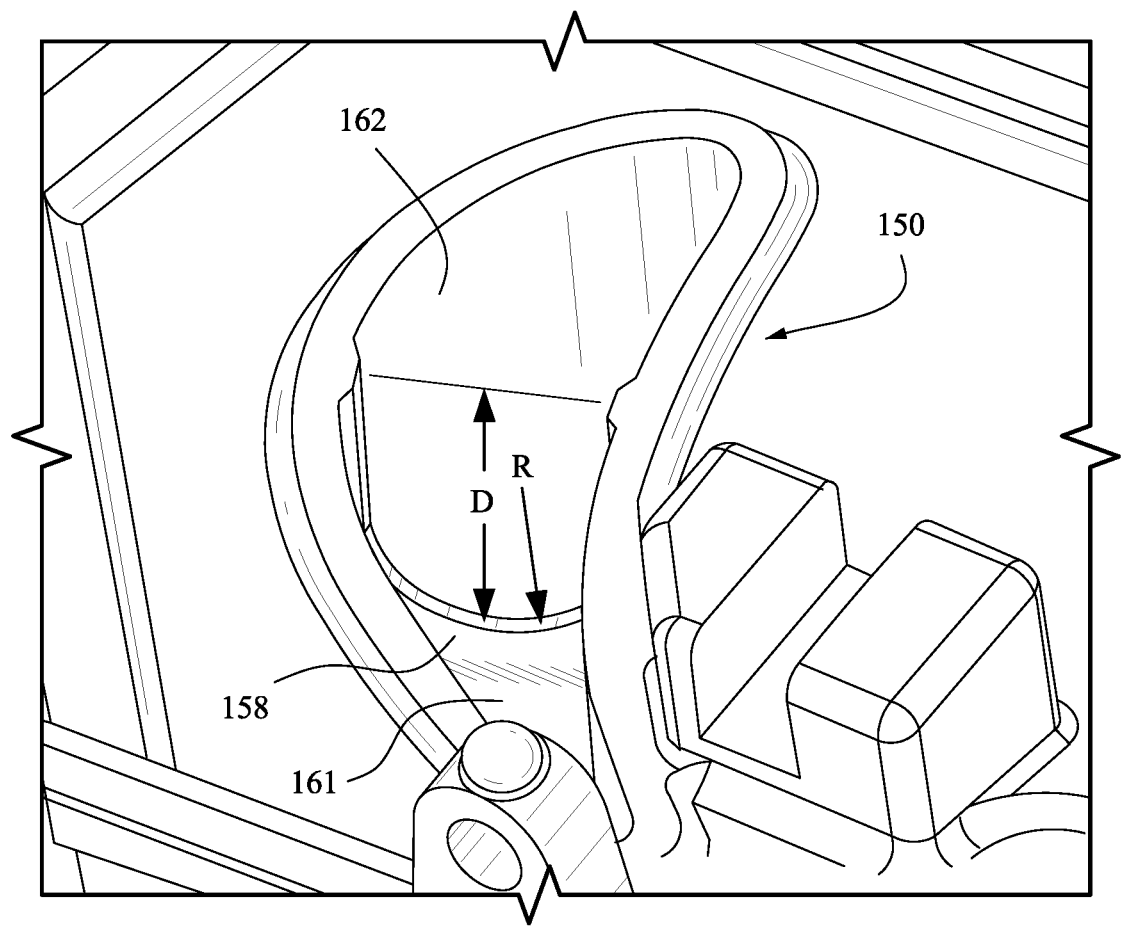
FIG. 8 is a perspective view of another exemplary interior of the turbine section vane of FIG. 4.
Figure 9:
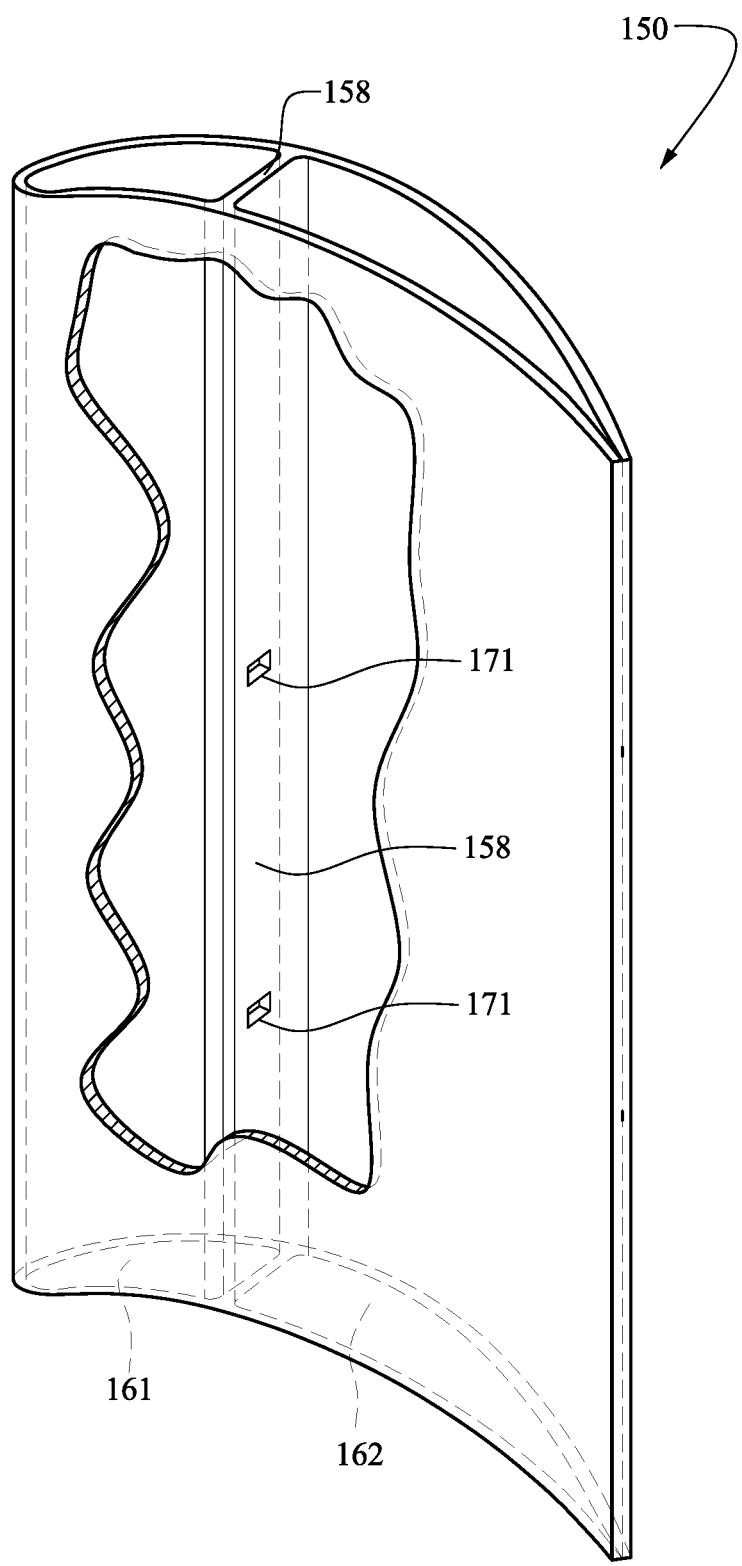
FIG. 9 is a perspective view of another exemplary interior of the turbine section vane of FIG. 4.

As shown in FIGS. 7-9, the ribs 158 may allow communication between the forward compartment 161 and the aft compartment 162. For example, the ribs 158 might extend only part of the length of the vane assembly 150 (FIGS. 7 and 8). Alternatively or in conjunction with the shortened length, the ribs 158 may include openings 171 to allow direct communication through the ribs 158 from the forward compartment 161 to the aft compartment 162. It is contemplated that the ribs 158 might be omitted altogether and only one compartment and one impingement sleeve may be enclosed within the outer shell 56. It is also contemplated that the "one compartment" configuration may include the forward and aft impingement sleeves 159, 160. The number of impingement openings in this configuration may be selected as discussed above with the "two compartment" configuration. It is also contemplated that there may be more than two compartments and more than two impingement sleeves.

It is further contemplated that an end of the rib 158 may be cut out so that an end of the rib 158 has a curved shape. The depth D of the cutout at the middle of the rib may be, for example, 1.3 inches, while the curvature of radius R may be, for example, 0.5". It should be understood that the depth D and curvature of radius R of the curved cutout may be more or less than the dimensions disclosed above. It should also be understood that the ratio between the depth D and the radius of curvature R of the curved cutout may be, for example, 2.6 (depth D to curvature of radius R). In addition, the ratio (depth D to curvature of radius R) may be greater or less than the 2.6 ratio discussed above.

It should be understood that the volume of open space between the forward compartment 161 and the aft compartment 162 may be sized as a function of the volume of cooling fluid flowing through the vane assembly 150. In addition, the rib 158 may be modified to allow communication between compartments in conjunction with reducing the number of impingement openings in the forward and/or aft impingement sleeves. In a scenario in which the rib 158 allows communication between compartments and the number of impingement openings is reduced, the shape size of the openings between the compartments and the number of impingement openings may be coordinated to achieve an optimal or desired pressure of the cooling fluid in the aft compartment 162.

An adapter (not shown) may be positioned at an opposite end of the air tube 170. The adapter may enable the air tube 170 to be properly sealed to the side of the diaphragm 152 so that the cooling fluid can be delivered to the wheelspace area 42 without pressurizing the chamber 168. The adapter may allow the air tube 170 to thermally shift and/or pivot within the opening 70 (or other opening) without compromising the seal around the air tube 170.

It is contemplated that the stationary component 40 may be converted to the stationary component 140 in any number of ways. For example, the diaphragm 52 may be removed from the stationary component 40 and replaced with the diaphragm 152 with the air tube 170 and the adapter being preassembled to the diaphragm 152. In addition, the rib 58 may be cut and/or bored to form the rib 158.

Also, converting the stationary component 40 to the stationary component 140 may involve replacing the forward and/or aft impingement sleeves 59, 60 with the forward and/or aft impingement sleeves 159, 160. Alternatively, the conversion may involve filling or covering some of the impingement openings in the forward impingement sleeve 159 and/or the aft impingement sleeve 60. The filling or covering over the impingement holes in the impingement sleeves 59, 60 may be accomplished using adhesive, cement, or any other material that may cover selected impingement openings. It should be understood, that a plate (not shown) may be added to the impingement sleeves 59, 60 when converting the vane assembly 50 to the vane assembly 150.

Another way the stationary component 40 may be converted to the stationary component 140 may be by attaching an assembly of the air tube 170 and the adapter to the diaphragm 152 at the opening 70.

The present invention may be applied to a variety of air-ingesting turbomachines. This may include, but is not limiting to, heavy-duty gas turbines, aero-derivatives, or the like. Although the following discussion relates to the gas turbine illustrated in FIG. 1, embodiments of the present invention may be applied to a gas turbine with a different configuration. For example, but not limiting of, the present invention may apply to a gas turbine with different, or additional, components than those illustrated in FIG. 1.

The present disclosure may be applied to the variety of gas turbine engines that compress an ingested air, such as, but not limiting of, a heavy-duty gas turbine; an aero-derivative gas turbine; or the like. An embodiment of the present disclosure may be applied to either a single gas turbine engine or a plurality of gas turbine engines. An embodiment of the present disclosure may be applied to a gas turbine engine operating in a simple cycle or combined cycle.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A stationary component extending from a casing of a turbine section of a turbine engine system to a wheelspace area, the stationary component being configured to deliver cooling fluid to the wheelspace area, the stationary component comprising:
    a hollow vane assembly with an interior rib separating a first interior compartment from a second interior compartment, the first and second interior compartments being configured to receive the cooling fluid, the cooling fluid being allowed to communicate between the first and second interior compartments; and
    a diaphragm attached to the hollow vane assembly and configured to receive the cooling fluid from the hollow vane assembly, the diaphragm comprising a chamber and a tube extending through the chamber, the tube being configured to isolate the chamber from the cooling fluid while delivering the cooling fluid from the hollow vane assembly to the wheelspace area,
    wherein the first interior compartment includes a first impingement sleeve with impingement openings and the second interior compartment includes a second impingement sleeve with impingement openings,
    wherein the tube is directly connected to only one of the first and second impingement sleeves, and
    wherein the rib does not extend the entire length of the hollow vane assembly to allow the cooling fluid to flow between the first and second interior compartments by flowing around the rib.

2. The stationary component of claim 1, wherein the rib comprises openings that provide fluid pathways between the first and second interior compartments.

3. The stationary component of claim 1, wherein a ratio of the impingement openings in the first impingement sleeve to the impingement openings in the second impingement sleeve is configured to maintain cooling fluid pressure in the first and second interior compartments above a threshold pressure.

4. The stationary component of claim 1 further comprising a network of seals that seals the chamber of the diaphragm from the wheelspace area.

5. A turbine comprising:
a compressor section configured to compress a flow of fluid;
a combustion section configured to combust a first portion of the fluid; and
a turbine section configured to receive the combusted fluid and drive a rotor, the turbine section comprising the stationary component of claim 1.

6. The stationary component of claim 1, wherein the first impingement sleeve and the second impingement sleeve are configured so that, before operation of the turbine engine system, said at least one of the impingement openings is covered up or blocked to prevent the flow of the cooling fluid through said at least one of the impingement openings.

7. A method for converting a stationary component extending from a casing of a turbine section of a turbine engine system to a wheelspace area, the stationary component, prior to being converted, comprising a) a hollow vane assembly with an interior rib separating a first interior compartment from a second interior compartment and b) a diaphragm with a chamber adapted to receive cooling fluid from the hollow vane assembly and deliver the cooling fluid to the wheelspace area, each of the first and second interior compartments of the hollow vane assembly comprising an impingement sleeve with impingement openings, the method comprising:
modifying the rib to permit the cooling fluid to flow between the first and second interior compartments;
increasing a sealing area of the diaphragm so that the chamber is sealed from the wheelspace area to prevent fluid communication between the chamber and the wheelspace area; and
filling and/or covering some of the impingement openings in the impingement sleeves.

8. The method of claim 7 further comprising installing an airflow tube in the diaphragm so that the airflow tube extends from the hollow vane assembly to the wheelspace area through the chamber and provides a flow path for the cooling fluid through the diaphragm while isolating the chamber from the cooling fluid.

9. The method of claim 7, wherein modifying the rib comprises cutting off an end of the rib to reduce the rib's length.

10. The method of claim 7, wherein modifying the rib comprises cutting openings in the rib that allow a pathway between the first and second interior compartments.

11. The method of claim 7, wherein modifying the rib comprises at least partially removing the rib.

12. The method of claim 7, further comprising:
installing an air tube assembly within the chamber of the diaphragm, the air tube assembly comprising a conduit and an adapter preassembled to the conduit;
covering an outlet of the hollow vane assembly in a manner that only allows gas to exit the hollow vane assembly through the conduit;
sealingingly attaching the conduit to an opening in a sidewall of the diaphragm; and
sealing off any remaining openings in the sidewall of the diaphragm so that the chamber is sealed from the wheelspace area to prevent fluid communication between the chamber and the wheelspace area through the openings in the sidewall of the diaphragm.

13. A method for converting a stationary component extending from a casing of a turbine section of a turbine engine system to a wheelspace area, the stationary component, prior to being converted, comprising a) a hollow vane assembly with an interior rib separating a first interior compartment from a second interior compartment and b) a diaphragm with a chamber adapted to receive cooling fluid from the hollow vane assembly and deliver the cooling fluid to the wheelspace area, each of the first and second interior compartments of the hollow vane assembly comprising an impingement sleeve with impingement openings, the method comprising:
modifying the rib to permit the cooling fluid to flow between the first and second interior compartments;
replacing the diaphragm with a modified diaphragm in which the chamber is fluidly isolated from the wheelspace area; and
filling and/or covering some of the impingement openings in the impingement sleeves.

14. The method of claim 13, wherein the modified diaphragm comprises an airflow tube extending from the hollow vane assembly to the wheelspace area through the chamber and providing a flow path for the cooling fluid through the diaphragm while isolating the chamber from the cooling fluid.

15. The method of claim 13, wherein the method further comprises replacing the impingement sleeves with modified impingement sleeves with fewer impingement openings.

16. The method of claim 13, wherein modifying the rib comprises cutting off an end of the rib to reduce the rib's length.

17. The method of claim 13, wherein modifying the rib comprises cutting openings in the rib that allow a pathway between the first and second interior compartments.

18. The method of claim 13, wherein modifying the rib comprises at least partially removing the rib.

19. The method of claim 13, further comprising:
removing the diaphragm from the hollow vane assembly; and
securing a modified diaphragm to a gas discharge side of the hollow vane assembly, the modified diaphragm having a chamber that is fluidly isolated from the wheelspace area and that comprises an air tube assembly within the chamber, the air tube assembly comprising a conduit and an adapter.

* * * * *